US007779859B2

(12) United States Patent
Denike et al.

(10) Patent No.: US 7,779,859 B2
(45) Date of Patent: Aug. 24, 2010

(54) FLAPPER WITH INSERT STOPS FOR CHECK VALVE

(75) Inventors: Stuart K. Denike, Phoenix, AZ (US);
Joseph J. Jira, Laveen, AZ (US);
Gerald S. McGonigle, Gilbert, AZ (US);
Jeremiah J. Warriner, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 908 days.

(21) Appl. No.: 11/513,514

(22) Filed: Aug. 30, 2006

(65) Prior Publication Data

US 2009/0071549 A1 Mar. 19, 2009

(51) Int. Cl.
*F16K 15/03* (2006.01)

(52) U.S. Cl. .................. 137/512.1; 251/64; 16/86 A; 16/86 R; 264/271.1

(58) Field of Classification Search .............. 137/512.1, 137/514, 527; 251/64; 264/271.1; 16/86 R, 16/86 A
See application file for complete search history.

(56) References Cited

U.S. PATENT DOCUMENTS

| 1,708,907 | A | * | 4/1929 | Spencer ................... 137/512.1 |
| 1,978,249 | A | * | 10/1934 | Decarie ....................... 16/86 A |
| 2,877,792 | A | * | 3/1959 | Tybus ...................... 137/512.1 |
| 2,898,080 | A | * | 8/1959 | Smith .......................... 251/82 |
| 3,047,012 | A | * | 7/1962 | Smith .................... 137/512.15 |
| 3,072,141 | A | * | 1/1963 | Wheeler, Jr. ............. 137/512.1 |
| 3,208,472 | A | | 9/1965 | Scaramucci |
| 3,533,438 | A | * | 10/1970 | Smith ....................... 137/512.1 |
| 3,538,946 | A | * | 11/1970 | Hilsheimer .............. 137/512.1 |
| 3,807,444 | A | | 4/1974 | Fortune |
| 4,005,732 | A | * | 2/1977 | Buckner ................... 137/512.1 |
| 4,041,696 | A | | 8/1977 | Morrison |

(Continued)

FOREIGN PATENT DOCUMENTS

DE 29617099 U1 1/1997

(Continued)

OTHER PUBLICATIONS

EP Search Report, 07115067.6-2422 dated Jan. 17, 2008.

(Continued)

*Primary Examiner*—John Rivell
*Assistant Examiner*—William McCalister
(74) *Attorney, Agent, or Firm*—Ingrassia Fisher & Lorenz, P.C.

(57) ABSTRACT

A check valve is provided that includes a valve body, a stop bar, a flapper, and a protrusion. The valve body has a flow channel extending therethrough, a first stop support, and a second stop support. The first and second stop supports extend axially from the valve body. The stop bar is coupled to and extends between the first and the second stop supports. The flapper is rotationally mounted to the valve body and comprises a first material. The protrusion is integrally molded with the flapper and extends axially therefrom. The protrusion comprises a second material that is non-metallic and different than the first material. The flapper is moveable between a closed position, in which the flapper at least substantially seals the flow channel, and a fully-open position, in which the protrusion contacts the stop bar and the flapper unseals the flow channel.

8 Claims, 3 Drawing Sheets

U.S. PATENT DOCUMENTS

| | | | | |
|---|---|---|---|---|
| 4,079,751 A | * | 3/1978 | Partridge et al. | 137/516.29 |
| 4,218,599 A | * | 8/1980 | Garn | 200/530 |
| 4,230,148 A | * | 10/1980 | Ogle, Jr. | 137/512.1 |
| 4,249,567 A | * | 2/1981 | Weiss | 137/512 |
| 4,251,987 A | | 2/1981 | Adamson | |
| 4,257,444 A | * | 3/1981 | Ogle et al. | 137/315.33 |
| 4,257,451 A | * | 3/1981 | Paton | 137/512.1 |
| 4,276,658 A | | 7/1981 | Hanson et al. | |
| 4,445,533 A | * | 5/1984 | DeFrees | 137/512.1 |
| 4,457,333 A | * | 7/1984 | Sharp | 137/454.2 |
| 4,585,026 A | * | 4/1986 | Norton | 137/512.1 |
| 4,628,954 A | * | 12/1986 | Dayus | 137/75 |
| RE32,362 E | * | 2/1987 | McCabe | 137/15.25 |
| 4,694,853 A | * | 9/1987 | Goodwin | 137/512.1 |
| 4,786,031 A | | 11/1988 | Waldrop | |
| 4,792,117 A | | 12/1988 | Kubota | |
| 4,863,458 A | * | 9/1989 | Bokros | 623/2.26 |
| 4,867,199 A | * | 9/1989 | Marx | 137/512.1 |
| 4,896,695 A | * | 1/1990 | Pysh | 137/512.1 |
| 4,977,926 A | * | 12/1990 | Hocking | 137/512.1 |
| 5,246,032 A | * | 9/1993 | Muddiman | 137/512.1 |
| 5,285,816 A | | 2/1994 | Herlihy | |
| 5,318,063 A | * | 6/1994 | Muddiman | 137/454.2 |
| 5,392,810 A | * | 2/1995 | Cooper et al. | 137/512.1 |
| 5,598,872 A | | 2/1997 | Kasugai et al. | |
| 5,694,765 A | | 12/1997 | Hield et al. | |
| 5,775,357 A | | 7/1998 | Regna et al. | |
| 5,819,790 A | * | 10/1998 | Cooper | 137/512.1 |
| 5,845,483 A | | 12/1998 | Petrowicz | |
| 5,934,648 A | | 8/1999 | Rivers et al. | |
| 6,012,483 A | * | 1/2000 | Beddies | 137/512.1 |
| 6,082,967 A | | 7/2000 | Loisy | |
| 6,098,656 A | * | 8/2000 | Farina | 137/512.1 |
| 6,210,266 B1 | | 4/2001 | Barton | |
| 6,237,625 B1 | * | 5/2001 | Randolph | 137/512.15 |
| 6,357,473 B1 | | 3/2002 | Porter et al. | |
| 6,726,715 B2 | | 4/2004 | Sutherland | |
| 6,901,942 B2 | | 6/2005 | Krimmer et al. | |
| 7,114,519 B2 | * | 10/2006 | Aitchison et al. | 137/518 |
| 7,325,569 B2 | * | 2/2008 | Denike et al. | 137/899.2 |
| 7,334,773 B2 | * | 2/2008 | Stout et al. | 251/294 |
| 7,422,029 B2 | * | 9/2008 | Denike et al. | 137/512.1 |
| 7,568,498 B2 | * | 8/2009 | Denike et al. | 137/512.1 |
| 2004/0069353 A1 | | 4/2004 | Pickelman | |
| 2005/0098752 A1 | | 5/2005 | Burrola et al. | |
| 2006/0179800 A1 | * | 8/2006 | Williams et al. | 55/312 |
| 2008/0072974 A1 | * | 3/2008 | Denike et al. | 137/527 |
| 2008/0128033 A1 | * | 6/2008 | McGonigle et al. | 137/512.1 |
| 2009/0071549 A1 | * | 3/2009 | Denike et al. | 137/512.1 |

FOREIGN PATENT DOCUMENTS

| | | |
|---|---|---|
| EP | 0361731 A2 | 4/1990 |
| EP | 1312763 A1 | 5/2003 |
| EP | 1691117 A1 | 8/2006 |
| GB | 2046405 A | 11/1980 |
| GB | 2347890 | 9/2000 |

OTHER PUBLICATIONS

EP Search Report, 06115067.8 dated May 30, 2008.

* cited by examiner

FLAPPER WITH INSERT STOPS FOR CHECK VALVE

TECHNICAL FIELD

The present invention relates to check valves and, more particularly, to reducing noise produced by check valves.

BACKGROUND

Check valves may be employed in any one of numerous situations. For example, check valves may be used in an air distribution system to control an amount of air that flows from one portion of an aircraft to another. In this regard, check valves may be disposed in a duct between an air source and one or more outlets for exhausting the received air to desired areas within the aircraft, such as, for example, to an aircraft cabin or an underfloor section of the aircraft.

One exemplary type of check valve that has been employed in aircraft is a split flapper check valve. A split flapper check valve typically includes a valve body, a pair of flappers, and a stop tube. The valve body is configured to be inserted into the air distribution system duct and includes an upstream side, a downstream side, and a pair of flow channels that extends between the upstream and downstream sides. A pair of stop supports extends axially away from the valve body, and the stop tube is coupled to and extends between the stop supports. The flappers are rotationally mounted on the valve body, and are moveable between closed and open positions to control flow through the flow channels.

Generally, split flapper check valve components are made of metallic materials. Consequently, when a sudden pressure change occurs and the flappers and stop tube contact each other, they may produce a relatively loud noise. During flight, the noise may be audible to passengers in the aircraft, which may not be desirable.

Accordingly, there is a need to reduce noise produced when the flappers and stop tube of a split flapper check valve contact each other. In addition, there is a need for split flapper check valve that is lightweight and relatively inexpensive to implement. Furthermore, other desirable features and characteristics of the present invention will become apparent from the subsequent detailed description and the appended claims, taken in conjunction with the accompanying drawings and the foregoing technical field and background

BRIEF SUMMARY

The present invention provides a check valve for disposal in a duct.

In one embodiment, and by way of example only, the check valve includes a valve body, a stop bar, a flapper, and a protrusion. The valve body has a flow channel extending therethrough, a first stop support, and a second stop support. The first and second stop supports extend axially from the valve body. The stop bar is coupled to and extends between the first and the second stop supports. The flapper is rotationally mounted to the valve body and comprises a first material. The protrusion is integrally molded with the flapper and extends axially therefrom. The protrusion comprises a second material that is non-metallic and different than the first material. The flapper is moveable between a closed position, in which the flapper at least substantially seals the flow channel, and a fully-open position, in which the protrusion contacts the stop bar and the flapper unseals the flow channel.

In another embodiment, and by way of example only, the check valve includes a valve body, a metallic stop bar, a metallic flapper, and a non-metallic protrusion. The valve body has a flow channel extending therethrough, a first stop support, and a second stop support, and the first and second stop supports extend axially from the valve body. The metallic stop bar is coupled to and extends between the first and the second stop supports. The metallic flapper is rotationally mounted to the valve body. The non-metallic protrusion is integrally molded with the metallic flapper and extending axially therefrom. The metallic flapper is moveable between a closed position, in which the metallic flapper at least substantially seals the flow channel, and a fully-open position, in which the non-metallic protrusion contacts the stop bar and the metallic flapper unseals the flow channel.

Other independent features and advantages of the preferred check valve will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
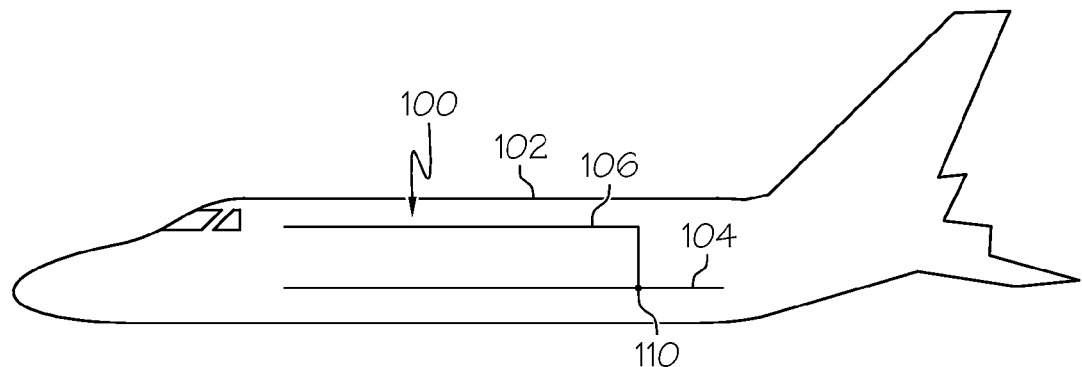
FIG. 1 is a simplified schematic diagram illustrating an air distribution system.

FIG. 1 is a simplified schematic diagram illustrating an air distribution system 100 disposed within an aircraft 102. The air distribution system 100 includes an inlet duct 104, one or more outlet ducts 106 (only one of which is shown here), and a valve 110 positioned in duct 106. The inlet duct 104 receives air from an air source, such as, for example, engine bleed air, and the outlet duct 106 exhausts air into desired sections of the aircraft 102. In one exemplary embodiment, the outlet duct 106 exhausts air into an aircraft cabin (not shown). The valve 110 is configured to control the air flow through the outlet duct 106 and to open and close when a pressure differential across the valve 110 exceeds a predetermined value.

Figure 2:
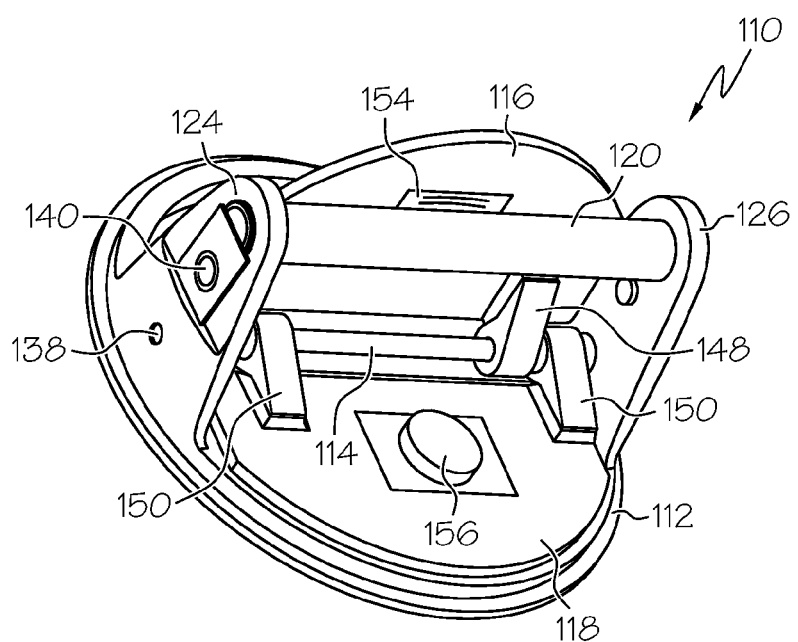
FIG. 2 is a perspective view of a split flapper check valve that may be implemented into the system shown in FIG. 1.
Figure 3:
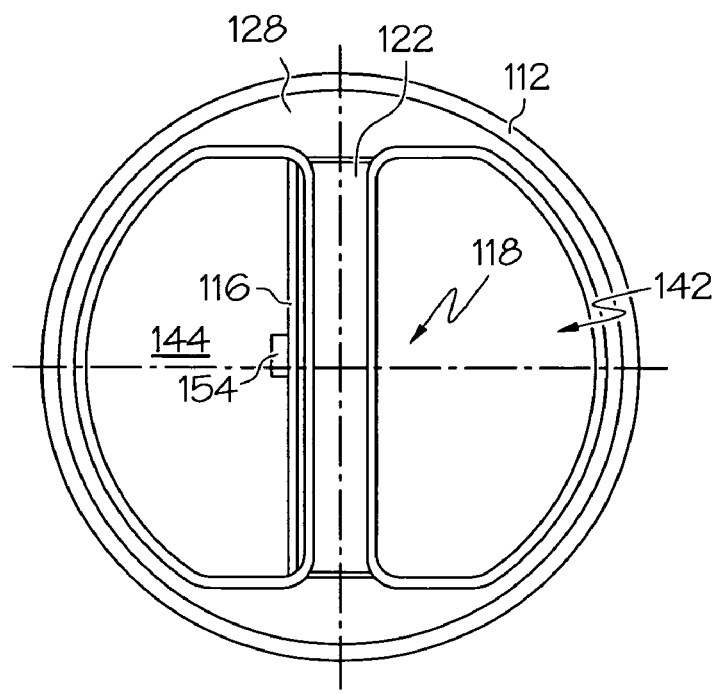
FIG. 3 is a forward view of the split flapper check valve shown in FIG. 2.
Figure 4:
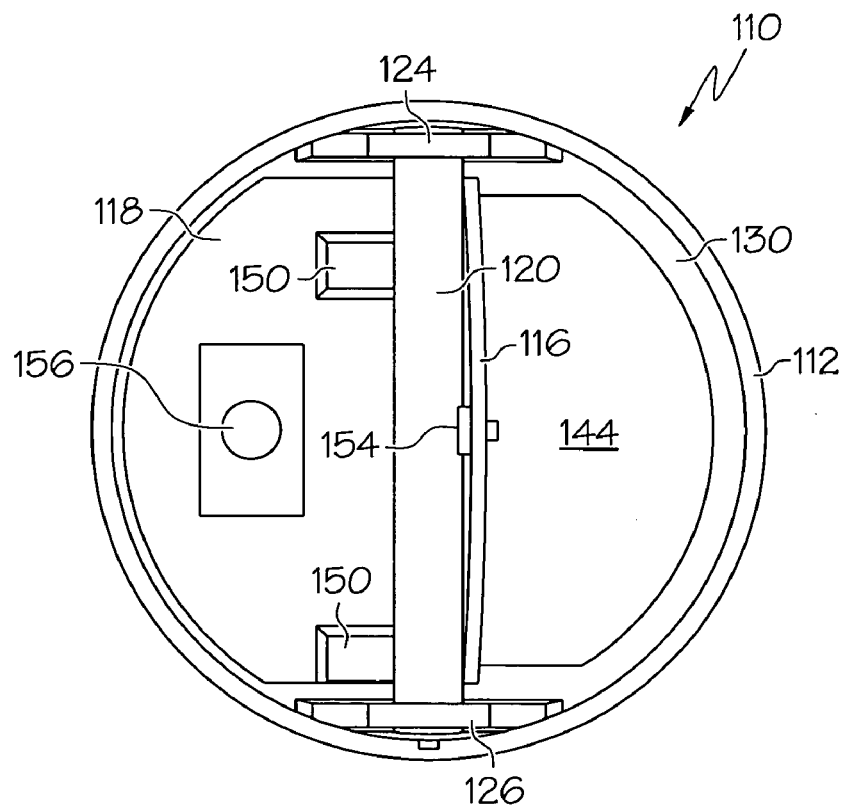
FIG. 4 is an aft view of the split flapper check valve shown in FIG. 2.

Turning now to FIGS. 2-4, an exemplary physical implementation of the valve 110 is depicted. The valve 110 includes a valve body 112, a shaft 114, two flappers 116, 118 and a stop bar 120. The valve body 112 is configured to be coupled to and disposed at least partially within the duct 106, and has a support bar 122 and two stop supports 124, 126. The valve body 112 is annularly shaped and has an upstream side 128, a downstream side 130, and a pair of flow channels 142, 144 that extend therebetween. The flow channels 142, 144 are separated from each other via the support bar 122. The two stop supports 124, 126 extend axially from the valve body 112 and are generally spaced equally apart from one another. The stop supports 124, 126 include two pairs of mount holes 138, 140 for mounting the shaft 114 and stop bar 120, respectively.

As alluded to previously, the shaft 114 extends between the stop supports 124, 126 via one pair of mount holes 138. Disposed substantially parallel and adjacent to the shaft 114 is the stop bar 120. The stop bar 120 prevents the flappers 116, 118 from contacting each other when in a full open position. Because the valve 110 typically experiences hundreds of open and close cycles over its lifetime, the stop bar 120 is preferably made of a suitably wear-resistant metallic material.

The two flappers 116, 118, which are also made of a suitably wear-resistant metallic material, are configured to at least partially seal and unseal the flow channels 142, 144, and are each rotationally mounted to the valve body 112, preferably via the shaft 114. Each flapper 116, 118 includes lugs 148, 150 and protrusions 154, 156 that extend therefrom. The lugs 148, 150 are formed on the flappers 116, 118, and include mount holes (not shown). The mount holes correspond to and align with the stop support mount holes 138 and allow the shaft 114 to extend therethrough.

The protrusions 154, 156 are configured to minimize noise that may be produced when the flappers 116, 118 contact the stop bar 120. In this regard, the protrusions 154, 156 extend axially from the flappers 116, 118 and are preferably made of a non-metallic material that, upon contact with the metallic material of the stop bar 120, produces a sound having a reduced noise level relative to the sound produced by metal on metal contact. In one embodiment, the non-metallic material is an elastomeric material. Examples of suitable elastomeric materials include, but are not limited to fluorosilicone. In another embodiment, the non-metallic material is an engineered composite material. Suitable materials include, but are not limited to a plastic, such as polyetherimide.

Figure 5:
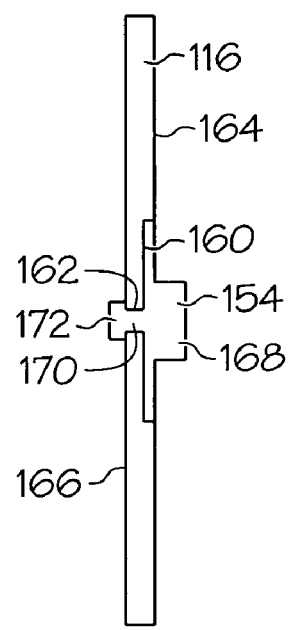
FIG. 5 is a cross section view of an exemplary flapper including a protrusion.
Figure 6:
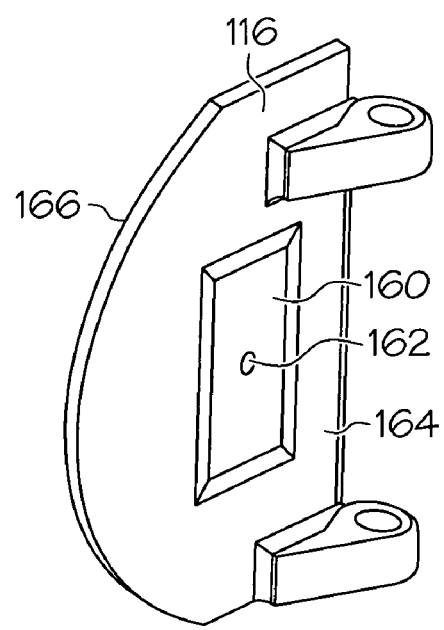
FIG. 6 is a perspective view of an exemplary flapper.

The protrusions 154, 156 and flappers 116, 118 are preferably integrally molded with each other, as depicted in FIGS. 5 and 6. FIGS. 5 and 6 show a cross section view of one flapper 116 and its corresponding protrusion 154 and a perspective view of the flapper 116 without the protrusion 154. Here, the flapper 116 includes a depression 160 formed therein within which the protrusion 154 is disposed. The depression 160 is preferably formed on a downstream side 164 of the flapper 116. The flapper 116 may include a mount hole 162 that extends at least partially therethrough while communicating with the depression 160. A portion of the protrusion 154 is disposed within the mount hole 162. In other embodiments, such as the embodiment shown in FIG. 5, the mount hole 162 extends through the flapper 116 to an upstream side 166 thereof. The protrusion 154 has a contact portion 168 and a connector portion 170. The contact portion is preferably sized larger than the mount hole 162 and is partially disposed within and extends axially from the depression 160. The connector portion 170 extends through the mount hole 162. In still other embodiments, the protrusion 154 also has a mount portion 172 that is disposed on the flapper upstream side 166 to further secure the protrusion 154 to the flapper 116.

Returning to FIGS. 2-4, the flappers 116, 118 are preferably biased toward the closed position and may each be coupled to one or more torsion springs 158 that, at least in the depicted embodiment, are coupled to the shaft 114. The torsion springs 158 supply a torsional force that urges the flappers 116, 118 toward the closed position to thereby seal the flow channels 142, 144. When the differential pressure magnitude exceeds a predetermined value and overcomes the torsional force, the flappers 116, 118 move to an open position and unseal the flow channels 142, 144. Preferably, the predetermined value is a maximum pressure that can be withstood by the inlet duct 104 and the outlet duct 106 without compromising their structural integrity.

As mentioned above, during operation, the flappers 116, 118 remain in the closed position if a pressure differential across the valve 110 is below the predetermined value. The protrusions 154, 156, do not contact the stop bar 120. Once the pressure differential exceeds the predetermined value, the valve 110 may only move to a partially open position; however, the stop bar 120 and protrusions 154, 156 remain separated from one another. When the valve 110 is in a fully open position, the protrusions 154, 156 rest against the stop bar 120. In cases in which a sudden pressure change occurs, the protrusions 154, 156 contact the stop bar 120 at a high velocity. Because the protrusions 154, 156 are made of a non-metallic material, such as an elastomeric or engineered composite material, a minimal amount of noise is produced when they contact the stop bar 120.

In addition to reducing valve noise, the above-described protrusions 154, 156 are advantageously easily and inexpensively retrofitted into existing valves. For example, the flappers 116, 118 may be detached from the valve 110 and a depression 160 and/or mount hole 162 (such as in FIG. 6) may be machined therein. The protrusions 154, 156 are then each formed and coupled to the flappers 116, 118 via an injection molding process. First, at least a portion of one of the flappers 116, 118 is placed into a mold that is shaped to complement the protrusion 154, 156 and sufficiently sized to allow a portion or substantially all of the flapper 116, 118 to be disposed therein. In addition to including a shape complementary to the contact portion 168 of the protrusion 154, the mold may also include a portion that is complementary to the mount portion 172. Next, an elastomeric or engineered composite material is injected into the mold and fills any empty space between the mold and flapper 116. Thus, depending on the particular embodiment, the material may fill the depression 160 and/or mount hole 162. After the material is injected into the mold, the material may be cured and the flapper and resulting protrusion formed thereon are removed from the mold.

Inclusion of the protrusions 154, 156 described above reduces the level of noise produced by the valve 110. In addition, the valve 110 remains lightweight, inexpensive to manufacture, and easily implemented into existing systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A check valve for disposal in a duct, the check valve comprising:
   a valve body having a flow channel extending therethrough, a first stop support, and a second stop support, the first and second stop supports extending axially from the valve body;
   a stop bar coupled to and extending between the first and the second stop supports;
   a flapper rotationally mounted to the valve body, the flapper comprising a first material and including an upstream side, a downstream side, a mount hole, and a depression, the mount hole extending between the upstream side and the downstream side, and the depression formed in the downstream side in communication with the mount hole; and a protrusion injection molded into the flapper and extending axially therefrom, the protrusion comprising a second material that is non-metallic and different than the first material and including a mount portion, a connector portion, and a contact portion, the mount portion disposed on the upstream side of the flapper, the connector portion extending through the mount hole, and the contact portion disposed within and extending away from the depression, wherein the flapper is moveable between a closed position, in which the flapper at least substantially seals the flow channel, and a fully-open position, in which the contact portion of the protrusion contacts the stop bar and the flapper unseals the flow channel.

2. The check valve of claim 1, wherein the second material comprises an elastomeric material.

3. The check valve of claim 1, wherein the elastomeric material comprises fluorosilicone.

4. The check valve of claim 1, wherein the second material comprises an engineered composite material.

5. The check valve of claim 4, wherein the engineered composite material comprises a plastic.

6. The check valve of claim 1, wherein the stop bar comprises a metal.

7. The check valve of claim 1, wherein the first material comprises a metallic material.

8. A check valve for disposal in a duct, the check valve comprising:

a valve body having a flow channel extending therethrough, a first stop support, and a second stop support, the first and second stop supports extending axially from the valve body;

a metallic stop bar coupled to and extending between the first and the second stop supports;

a metallic flapper rotationally mounted to the valve body and including an upstream side, a downstream side, a mount hole, and a depression, the mount hole extending between the upstream side and the downstream side, and the depression formed in the downstream side in communication with the mount hole; and a non-metallic protrusion injection molded into the metallic flapper and extending axially therefrom and including a mount portion, a connector portion, and a contact portion, the mount portion disposed on the upstream side of the metallic flapper, the connector portion extending through the mount hole, and the contact portion disposed within and extending away from the depression, wherein the metallic flapper is moveable between a closed position, in which the metallic flapper at least substantially seals the flow channel, and a fully-open position, in which the contact portion of the non-metallic protrusion contacts the stop bar and the metallic flapper unseals the flow channel.

* * * * *